(No Model.)
2 Sheets—Sheet 2.
J. B. RAAB.
OIL FILTER.
No. 604,568. Patented May 24, 1898.
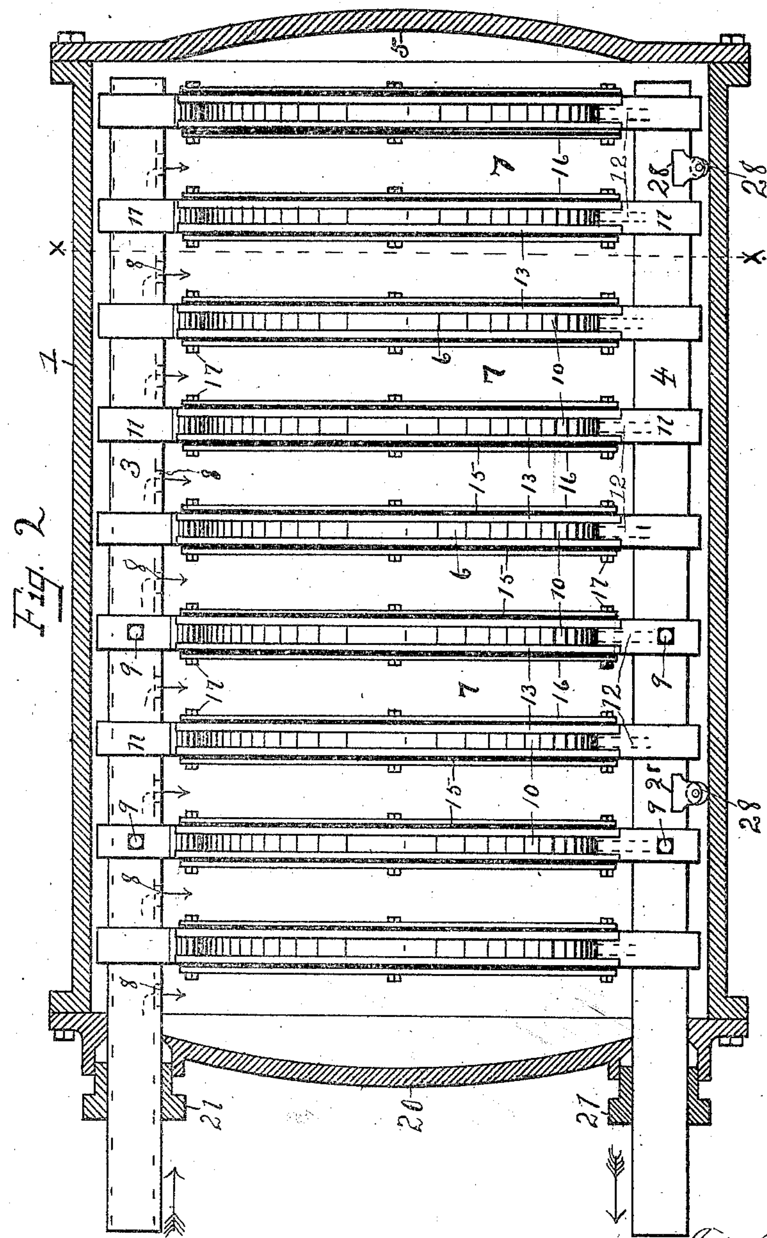
WITNESSES
Charles B. Nevin.
Wm Voss
John B. Raab,
INVENTOR
By R. J. McCarty,
his ATTORNEY (No Model.)
2 Sheets—Sheet 1.
J. B. RAAB.
OIL FILTER.
No. 604,568.
Patented May 24, 1898.
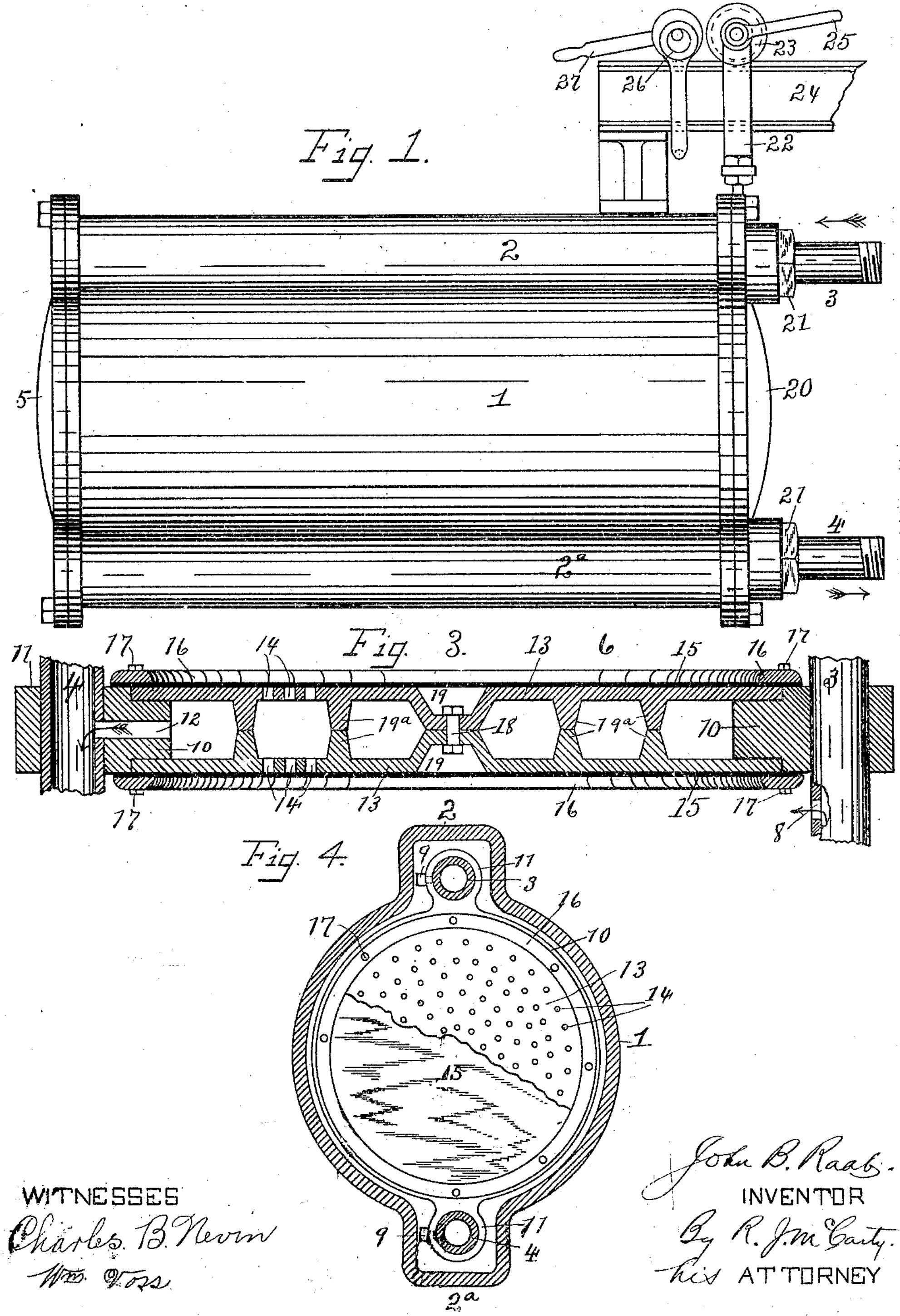
WITNESSES
Charles B. Nevin
Wm. Voss
John B. Raab.
INVENTOR
By R. J. McCarty.
his ATTORNEY

UNITED STATES PATENT OFFICE.

JOHN B. RAAB, OF DAYTON, OHIO, ASSIGNOR TO W. P. CALLAHAN & CO., OF SAME PLACE.

OIL-FILTER.

SPECIFICATION forming part of Letters Patent No. 604,568, dated May 24, 1898.

Application filed November 22, 1897. Serial No. 659,439. (No model.)

*To all whom it may concern:*

Be it known that I, JOHN B. RAAB, a citizen of the United States, residing at Dayton, in the county of Montgomery and State of Ohio, have invented certain new and useful Improvements in Oil-Filters; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means for filtering oil—such as linseed, cotton-seed, and other oils—directly from the oil-press. Heretofore it has been the custom to place the oil in tanks after coming from the press to permit it to settle, after which the clear oil is placed in barrels for shipment and the settlings are passed through a filter-press to reclaim the residue of oil remaining therein. The time required for the settlings or suspended matter to precipitate or form in the tank or tanks is usually from six weeks to two months.

The object of this invention is to overcome the necessity of placing the oil in tanks and consuming this time in preparing it for the market; and a further object of this invention is to dispense with the usual filter-presses, or, rather, the necessity that calls for the use of them.

Referring to the accompanying drawings, Figure 1 is a side elevation of my improved oil-filter. Fig. 2 is a longitudinal mid-sectional view thereof. Fig. 3 is an enlarged section through one of the filter-buckets. Fig. 4 is a reduced section on the line $x$ $x$, Fig. 2.

Throughout the specification similar reference characters indicate corresponding parts in the several views.

The cylinder 1 has upper and lower pipe-channels 2 and 2ª, in which the inlet and outlet oil-pipes 3 and 4 are removably placed, and the said cylinder has a fixed head 5. Upon the oil-pipes 3 and 4 there are placed a series of filter-buckets 6, at equal distances apart, to provide a series of intervening spaces 7, into which the oil is pumped through openings 8 in pipe 3 from the oil-press. Each of said buckets is secured in position by set-screws 9. Describing minutely the construction of said buckets, reference is made to Figs. 3 and 4 of the drawings, where 10 designates a ring having offsets 11 11, with openings for the pipes 3 and 4. The pipes are finished off to fit snugly the openings in said offsets to prevent the passage of any oil or dirt through said openings. One of said offsets—to wit, the one that incloses the outlet-pipe—has a channel 12 for the passage of oil from the buckets to said outlet-pipe.

13 13 designate the filter-plates, each of which has a series of oil-orifices 14 and upon which filter-cloths 15 15 are placed.

16 16 designate rings which secure the filter-plates 13 13 and the cloths 15 15 firmly in position against the sides of the ring 10 by means of bolts 17. The filter-plates project inwardly at their centers to form a central bearing, at which point they are secured by a bolt 18, the ends of said bolt lying in recesses 19 19, formed by projecting the plates inwardly at that point. Throughout the inner sides of the filter-plates there are provided a series of inwardly-projecting lugs 19ª, which meet and form supports for the plates against any inward pressure. It will be understood that each of the buckets is constructed in accordance with that shown in Figs. 3 and 4.

20 is a cylinder-head that is rigidly mounted on the pipes by packing-rings 21 21. This head, together with the pipes and the buckets, forms a movable frame that may be moved in and out of the cylinder in one body, the removal thereof being necessary to remove the deposits or accumulations from the cloths. The operation of removing the said frame from the cylinder is effected through the following mechanism:

22 is a hanger bolted at its lower end to the upper part of the front head 20 and carrying on its upper end a toothed pinion 23, that meshes with a horizontal rack 24, which is supported in any suitable manner on stationary supports above the cylinder. The pinion is driven by a crank 25, and in its travel along the rack the hanger 22 moves outwardly with the frame, which, as hereinbefore stated, consists of the pipes, the buckets, and the front head. When this movement is sufficient to bring the innermost bucket near the mouth of the cylinder, an eccentric 26 is moved out to the position that the hanger 22 now occupies and is coupled onto the inlet-pipe 3 by a link or any suitable connection. The crank 27 is then turned to operate the eccentric to raise the inner or rear end of the frame, after which the frame is entirely removed from the cylinder by the further operation of the pinion through the crank 25. The lower pipe 4 is provided with rollers 28, that enable an easy removal of the frame from the cylinder. The oil is pumped into the pipe 3 and enters the spaces between the buckets through the ports 8 and filters through the cloths and orifices 14 into the interior chambers, from whence it passes out through the channels 12 into the discharge-pipe 4.

Having fully described my invention, I claim—

1. In an oil-filter, the combination with a cylinder, of inlet and outlet pipes located in opposite sides of said cylinder and throughout the length thereof, the inlet-pipe being provided with a series of oil-orifices throughout its length, a series of filter-buckets mounted on said pipes with intervening spaces into which the oil enters from said inlet-pipe and from whence it enters the filter-buckets, and an oil-channel leading from the interior of each of said buckets to the outlet-pipe, the said pipes and buckets being removable from the cylinder in a body, substa for the purposes specified.

2. A filtering apparatus com bination with a cylinder from a it may be freely moved, an in pipe, a series of filter-buckets ri on said pipes with space betw into which oil is forced throu orifices in the inlet-pipe, and c ing from the interior of said b outlet-pipe, and a cylinder-hea said pipes, substantially as des 3. In an oil-filter, the combi cylinder having pipe-channel sides, and inlet and outlet pipe orifices throughout their inner ries of filter-buckets rigidly mo pipes, each of said buckets consi 13 and cloths 15, a ring 10 agair plates and cloths are firmly h rings being placed on the pipe distances apart, and having c one side through which the oil e let-pipe from the interior of th herein shown and described.

In testimony whereof I affix in presence of two witnesses.

JOHN

Witnesses:

R. J. McCarty,

Wm. Voss.